United States Patent
Obermayr

(10) Patent No.: US 12,461,242 B2
(45) Date of Patent: Nov. 4, 2025

(54) DRONE HAVING FLIGHT-DIRECTION-DEPENDENT SENSOR ORIENTATION FOR AUTONOMOUS DRONE APPLICATIONS, AND METHOD FOR AVOIDING COLLISIONS

(71) Applicant: Siemens Energy Global GmbH & Co. KG, Bayern (DE)

(72) Inventor: Stefan Obermayr, Duisburg (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 151 days.

(21) Appl. No.: 18/286,716

(22) PCT Filed: Mar. 21, 2022

(86) PCT No.: PCT/EP2022/057291
§ 371 (c)(1),
(2) Date: Oct. 12, 2023

(87) PCT Pub. No.: WO2022/223209
PCT Pub. Date: Oct. 27, 2022

(65) Prior Publication Data
US 2024/0199244 A1 Jun. 20, 2024

(30) Foreign Application Priority Data
Apr. 19, 2021 (DE) .................. 10 2021 203 823.9

(51) Int. Cl.
*G01S 17/00* (2020.01)
*B64U 20/70* (2023.01)
(Continued)

(52) U.S. Cl.
CPC ............ *G01S 17/931* (2020.01); *B64U 20/70* (2023.01); *B64U 20/87* (2023.01); *G01S 13/931* (2013.01);
(Continued)

(58) Field of Classification Search
CPC ........... G05D 1/10; B64C 39/02; G01S 17/00; G01S 17/031; G01S 13/931; G01S 15/931
See application file for complete search history.

(56) References Cited

U.S. PATENT DOCUMENTS 9,527,588 B1   12/2016  Rollefstad
9,594,381 B1 *  3/2017  Clark ..................... E04H 15/50
(Continued)

FOREIGN PATENT DOCUMENTS

CN          212074454 U    12/2020
WO   WO-2010137596 A1 *  12/2010  ........... B64C 39/024
WO       2017035590 A1     3/2017

OTHER PUBLICATIONS

PCT International Search Report and Written Opinion of International Searching Authority mailed Mar. 21, 2022 corresponding to PCT International Application No. PCT/E P2022/057291 filed Jul. 5, 2022.

*Primary Examiner* — Tan Q Nguyen
(74) *Attorney, Agent, or Firm* — Wolter Van Dyke Davis, PLLC

(57) ABSTRACT

A drone includes a body and motors or drives on the body which allow the drone to fly. The drone has two sensors, for steering and for avoiding collisions, and the sensors are each mounted on a servo. The drone also has a camera. A method for avoiding collisions of the drone includes the combination of two detectable 180° hemispheres of the two sensors such that the entire surroundings of the drone is detectable.

17 Claims, 2 Drawing Sheets

(51) Int. Cl.
  *B64U 20/87* (2023.01)
  *G01S 13/931* (2020.01)
  *G01S 15/931* (2020.01)
  *G01S 17/931* (2020.01)
  *H04N 23/695* (2023.01)
  *B64U 10/13* (2023.01)
  *B64U 101/30* (2023.01)
  *G05D 1/00* (2024.01)

(52) U.S. Cl.
  CPC ......... *G01S 15/931* (2013.01); *H04N 23/695* (2023.01); *B64U 10/13* (2023.01); *B64U 2101/30* (2023.01)

(56) References Cited

U.S. PATENT DOCUMENTS

| | | | |
|---|---|---|---|
| 10,351,241 B2* | 7/2019 | Pfoertzsch | G05D 1/0094 |
| 2003/0155463 A1 | 8/2003 | Cox | |
| 2019/0084670 A1 | 3/2019 | Sharma | |
| 2020/0116856 A1* | 4/2020 | Roberts | G01S 13/46 |
| 2020/0284566 A1* | 9/2020 | Viviani | F42B 12/382 |
| 2021/0004003 A1* | 1/2021 | Gury | B64U 20/87 |
| 2021/0009267 A1* | 1/2021 | Miller | G08G 5/76 |
| 2022/0035383 A1* | 2/2022 | Zhong | B64U 20/87 |

* cited by examiner

DRONE HAVING FLIGHT-DIRECTION-DEPENDENT SENSOR ORIENTATION FOR AUTONOMOUS DRONE APPLICATIONS, AND METHOD FOR AVOIDING COLLISIONS

CROSS REFERENCE TO RELATED APPLICATIONS

This application is the US National Stage of International Application No. PCT/EP2022/057291 filed 21 Mar. 2022, and claims the benefit thereof, which is incorporated by reference herein in its entirety. The International Application claims the benefit of German Application No. DE 10 2021 203 823.9 filed 19 Apr. 2021.

FIELD OF INVENTION

The invention relates to a drone having a special installation of the sensors and to methods.

BACKGROUND OF INVENTION

For the autonomous flight of inspection drones, as are to be increasingly used in constricted spaces and pipelines of facilities or in power plant service, it is necessary to recognize and fly around obstacles in a timely manner.

Standard sensors which come into consideration for this purpose are, for example, lidar, radar, infrared, ultrasound, etc.

These sensors all have a restricted range of action, relating to both their working angle and also the working distance. Equipping a drone completely with complete distance sensors thus requires a very high number of individual sensors, since they have to cover a closed sphere having different distance ranges.

This results in three fundamental problems:
  The takeoff weight significantly increases, which limits performance and flight time.
  The sensors can crosstalk, i.e., the transmitted signal of one sensor can be detected after multiple reflection by another and incorrectly assessed as a useful signal, which results in uncontrolled behavior of the drone.
  The processing of a large number of sensor signals— quasi in real time—requires a high computing performance on board. This computing unit also influences the flight properties due to its increased weight.

For the outdoors, there are GPS-based drones, which fly predetermined routes in a supervised manner by means of predetermined waypoints in combination with ultrasonic sensors and barometers. The collision probability is low from a specific height above obstacles. A complete detection of the surroundings is therefore omitted.

For the indoors, up to this point there have only been "collision-resistant" drones, which permit a collision at low velocities due to a cage, for example.

However, these drones have to be operated by specially trained pilots and are quite maintenance-intensive due to the frequent "deliberate" collisions.

The cage is heavy and therefore significantly shortens the possible usage duration.

SUMMARY OF INVENTION

The invention therefore has the object of solving the above-mentioned problem.

The object is achieved by a drone as claimed and a method as claimed.

The dependent claims list further advantageous measures which can be combined with one another, as desired, in order to achieve further advantages.

BRIEF DESCRIPTION OF THE DRAWINGS

In the figures

DETAILED DESCRIPTION OF INVENTION

The figures and the description represent only exemplary embodiments of the invention.

Figure 1:
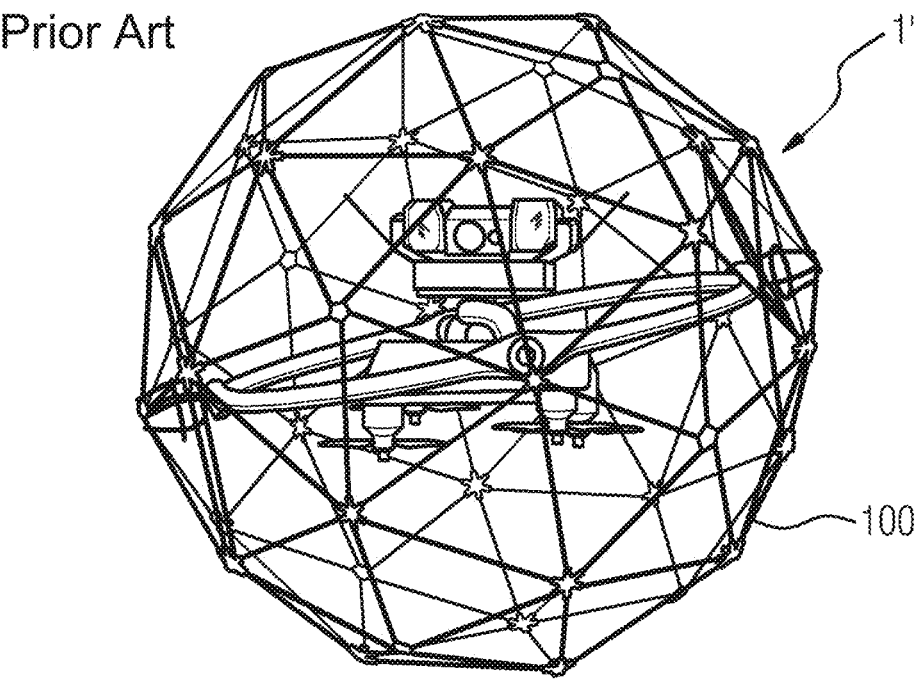
FIG. 1 shows a drone according to the prior art.
Figure 3:
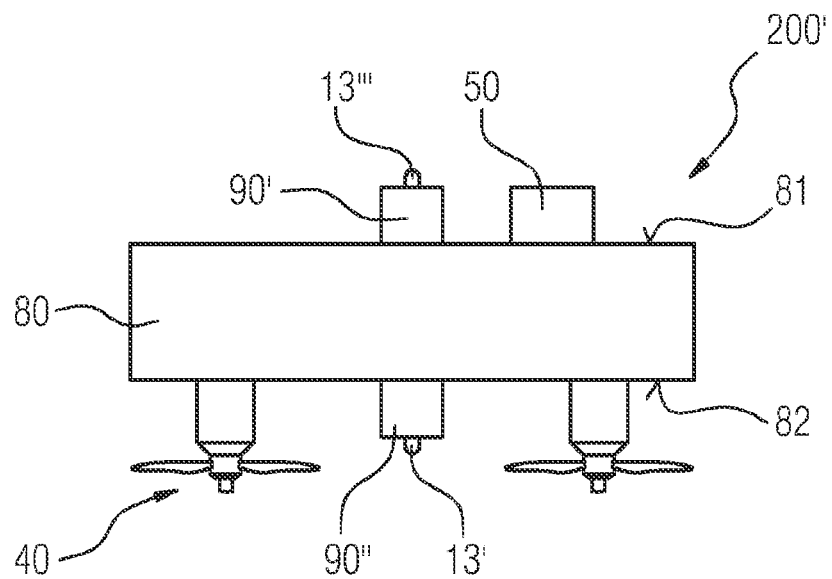
FIGS. 3, 4 show drones according to the invention.

Instead of using a large number of sensors along an entire spherical circumference 100 of a drone 1' according to the prior art (FIG. 1) for collision avoidance as described above, it is proposed that only two sensors 13', 13" be used—in particular one above and one below a fuselage 80 of a drone 200', 200" (FIG. 3).

These sensors 13, 13', 13" are installed according to the invention on a commercially available pan-tilt servo 90 (FIG. 2), as is typically used for the image stabilization of cameras.

This pan-tilt servo 90 can be embodied extremely lightly if commercially available micro-servos are used.

Any sensor for detecting distances can be used as a sensor, thus in particular lidar, radar, infrared, or ultrasound.

This has the following advantages:
  This structure enables the orientation of a sensor 13 freely along a hemisphere.
  The intended flight direction of the drone 200', 200" is known at all times, it results from the combination of the control axes pitch, roll, yaw, and throttle.
  The resulting movement vector can be calculated easily from these four control axes. This is the case at least at low velocities, since flight dynamics and wind resistance play a subordinate role. An inspection drone typically moves at walking speed.
  The intended movement vector is immediately accepted by the pan-tilt mechanism and thus directs one of the two distance sensors of the drone onto the region which will be flown in future. In the case of positive throttle input (ascending flight) only the upper sensor is active, in the case of descending flight, only the lower one. Any crosstalk of the sensors 13 is thus ruled out.
  From the combination of the two detectable 180° hemispheres, it is now possible to monitor the entire surroundings of the drone 200', 200" using only two sensors. This is only accurate for one direction at each moment, but this direction is the only relevant one in each case, since the drone 200', 200" attempts to move there.
  If an obstacle is identified along the projected path, influence is automatically taken on the planned route and alternative paths are sought. This type of obstacle planning can already be carried out by light microcontrollers, which only insignificantly has influence on the takeoff weight.

Figure 2:
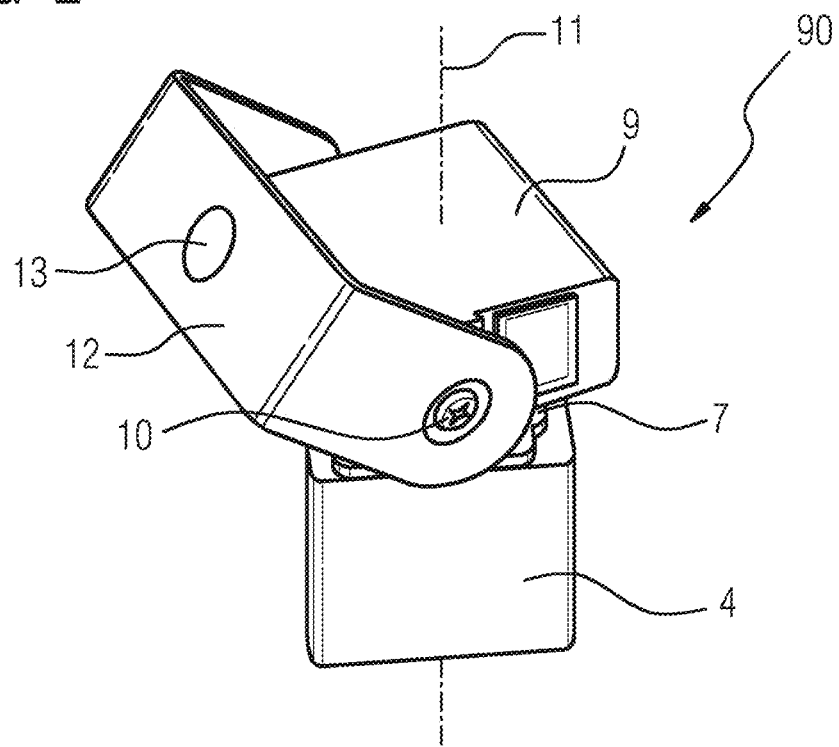
FIG. 2 shows a servo for a drone according to the invention.

FIG. 2 shows a servo 90 according to the pan-tilt mechanism.

This servo 90 includes a base 4.

The base 4 can be fastened on any body or fuselage 80.

A first joint 7 adjoins the base 4, which can rotate and tilt a first rotational body 9 around a longitudinal axis 11.

A second joint or axis 10 is present on this first rotational body 9. In particular a bracket 12 is moved by the second joint or axis 10 in the form of an axis.

The bracket 12 is in particular made in U-shaped fashion here.

A sensor 13 is present at or on the U-bottom of the bracket 12.

According to the invention, two such servos 90 are used to control the drone 200', 200".

FIG. 3 shows a drone 200' according to the invention.

The drone 200' includes a fuselage 80 having propellers 40 or drive means 40 known as such and in a known and required number, in particular 4 propellers.

The shape of the fuselage 80 is only schematically shown.

The arrangement of the drive means is only schematically shown here, i.e., it can be arranged on the lower side 82 or at the height of the fuselage 80, on the lateral surfaces 83, 84, . . . .

A servo 90', 90" according to FIG. 2, each of which include a sensor 13', 13", is arranged in each case on the upper side 81 and on the lower side 82 of the fuselage 80.

Figure 4:
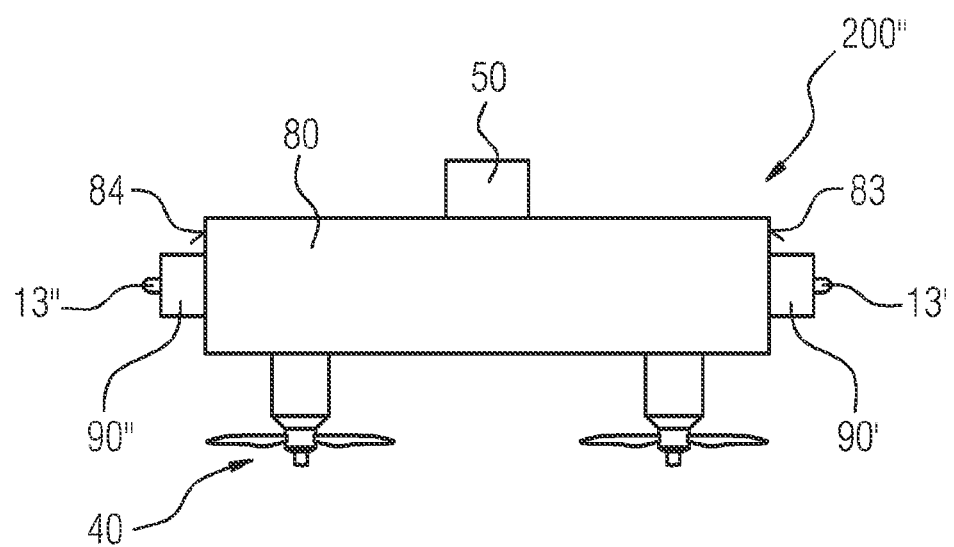

FIG. 4 shows another drone 200" proceeding from FIG. 3, in which the servos 90', 90" are arranged on the lateral surfaces 83, 84 of the fuselage 80.

A camera 50 is present on both drones 200', 200" on the upper side 81 and/or lower side 82.

The mentioned large number of distance sensors has up to this point not permitted autonomous flight in constricted and closed spaces. Expenditure for both sensors and also computing are significantly reduced by the illustrated invention.

The invention claimed is:

1. A drone, comprising:
   a fuselage,
   motors or drives in and on the fuselage, adapted to cause the drone to fly,
   at least one camera,
   a first control sensor disposed on a first servo and a second control sensor disposed on a second servo, wherein the first control sensor and the second control sensor are the only control sensors, and
   wherein the first control sensor is configured to detect objects anywhere in a first hemisphere around the drone, wherein the second control sensor is configured to detect objects anywhere in a second hemisphere around the drone, and wherein the first hemisphere and the second hemisphere constitute a full sphere around the drone anywhere in which objects can be detected.

2. A method for avoiding collisions of a drone, comprising:
   using the drone as claimed in claim 1, and
   detecting the entire surroundings of the drone from a combination of the first hemisphere and the second hemisphere.

3. The method as claimed in claim 2,
   wherein the first servo and the second servo each comprise a pan-tilt mechanism.

4. The method as claimed in claim 2, further comprising:
   using only one of the first control sensor and the second control sensor at any given time.

5. The method as claimed in claim 2, further comprising:
   activating the first control sensor and deactivating the second control sensor when the drone is to be flown toward a region in the first hemisphere.

6. The method as claimed in claim 5, further comprising:
   activating the second control sensor and deactivating the first control sensor when the drone is to be flown toward a region in the second hemisphere.

7. The drone as claimed in claim 1,
   wherein the first control sensor and the second control sensor are adapted for collision avoidance.

8. The drone as claimed in claim 1,
   wherein the drone comprises only one camera.

9. The drone as claimed in claim 1,
   wherein the first servo and the second servo each comprise a pan-tilt mechanism.

10. The drone as claimed in claim 1,
    wherein the first control sensor is mounted to a top of the fuselage and the second control sensor is mounted to a bottom of the fuselage.

11. The drone as claimed in claim 10,
    wherein the drone is configured such that during ascending flight, only the first control sensor is active, and
    wherein the drone is configured such that during descending flight, only the second control sensor is active.

12. The drone as claimed in claim 1,
    wherein the first control sensor and the second control sensor are mounted on opposite sides of the fuselage.

13. The drone as claimed in claim 1,
    wherein the drone is configured such that when moving toward a region in the first hemisphere, the first control sensor is active and the second control sensor is inactive.

14. The drone as claimed in claim 13,
    wherein the drone is configured such that when moving toward a region in the second hemisphere, the second control sensor is active and the first control sensor is inactive.

15. The drone as claimed in claim 1,
    wherein the drone is configured to receive a movement vector; and
    wherein the drone is configured to direct only one of the first control sensor and the second control sensor toward a region that will be flown based upon the movement vector.

16. The drone as claimed in claim 1,
    wherein the first control sensor and the second control sensor are both lidar sensors, radar sensors, infrared sensors, or ultrasonic sensors.

17. A drone, comprising:
    a fuselage;
    motors or drives in and on the fuselage, adapted to cause the drone to fly;
    at least one camera;
    a first control sensor disposed on a first servo and a second control sensor disposed on a second servo;
    wherein the first control sensor is configured to detect objects anywhere in a first hemisphere around the drone, wherein the second control sensor is configured to detect objects anywhere in a second hemisphere around the drone, wherein the first hemisphere and the second hemisphere constitute a full sphere around the drone anywhere in which objects can be detected;
    wherein the drone is configured such that when moving toward a region in the first hemisphere, the first control sensor is active and the second control sensor is inactive; and
    wherein the drone is configured such that when moving toward a region in the second hemisphere, the second control sensor is active and the first control sensor is inactive.

* * * * *